United States Patent [19]

Von Holdt

[11] 4,117,069
[45] Sep. 26, 1978

[54] METHOD OF MOLDING A CASSETTE HALF WITH WINDOW INSERT

[76] Inventor: John W. Von Holdt, 7430 N. Croname Rd., Niles, Ill. 60648

[21] Appl. No.: 804,824

[22] Filed: Jun. 8, 1977

Related U.S. Application Data

[62] Division of Ser. No. 683,906, May 6, 1976, Pat. No. 4,061,455.

[51] Int. Cl.² .......................... B29C 5/00; B29D 3/00; B29F 1/00
[52] U.S. Cl. .................................... 264/153; 264/157; 264/271; 264/328
[58] Field of Search ............... 264/138, 157, 264, 259, 264/271, 153, 328; 206/387; 242/199; 156/99, 108, 242, 245; 425/126 R, 129 R, 112

[56] References Cited

U.S. PATENT DOCUMENTS

| 2,690,021 | 9/1954 | Langan | 156/108 |
| 3,166,795 | 1/1965 | Joffe | 264/328 |
| 3,493,458 | 2/1970 | Santangelo | 264/271 |
| 3,909,088 | 9/1975 | Dennehey et al. | 206/487 |
| 3,934,842 | 1/1976 | Posso | 242/199 |
| 3,998,324 | 12/1976 | Roccaforte | 206/387 |

*Primary Examiner*—Willard E. Hoag
*Attorney, Agent, or Firm*—Charles F. Pigott, Jr.

[57] ABSTRACT

A half-section of a cassette casing having an embedded transparent wafer serving as a viewing window. The cassette casing section is formed by shearing the wafer from an elongated strip of transparent material, disposing and supporting the wafer within a cavity, and forcing a plasticized material into the cavity where it solidifies. The cavity is defined in an injection mold comprising a pair of relatively movable cavity plate assemblies with which are associated means for shearing and supporting the wafer.

7 Claims, 12 Drawing Figures

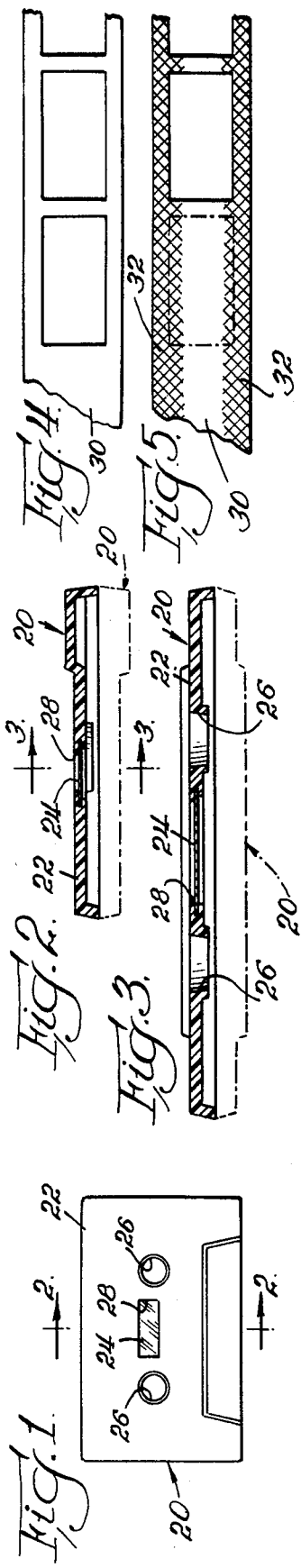
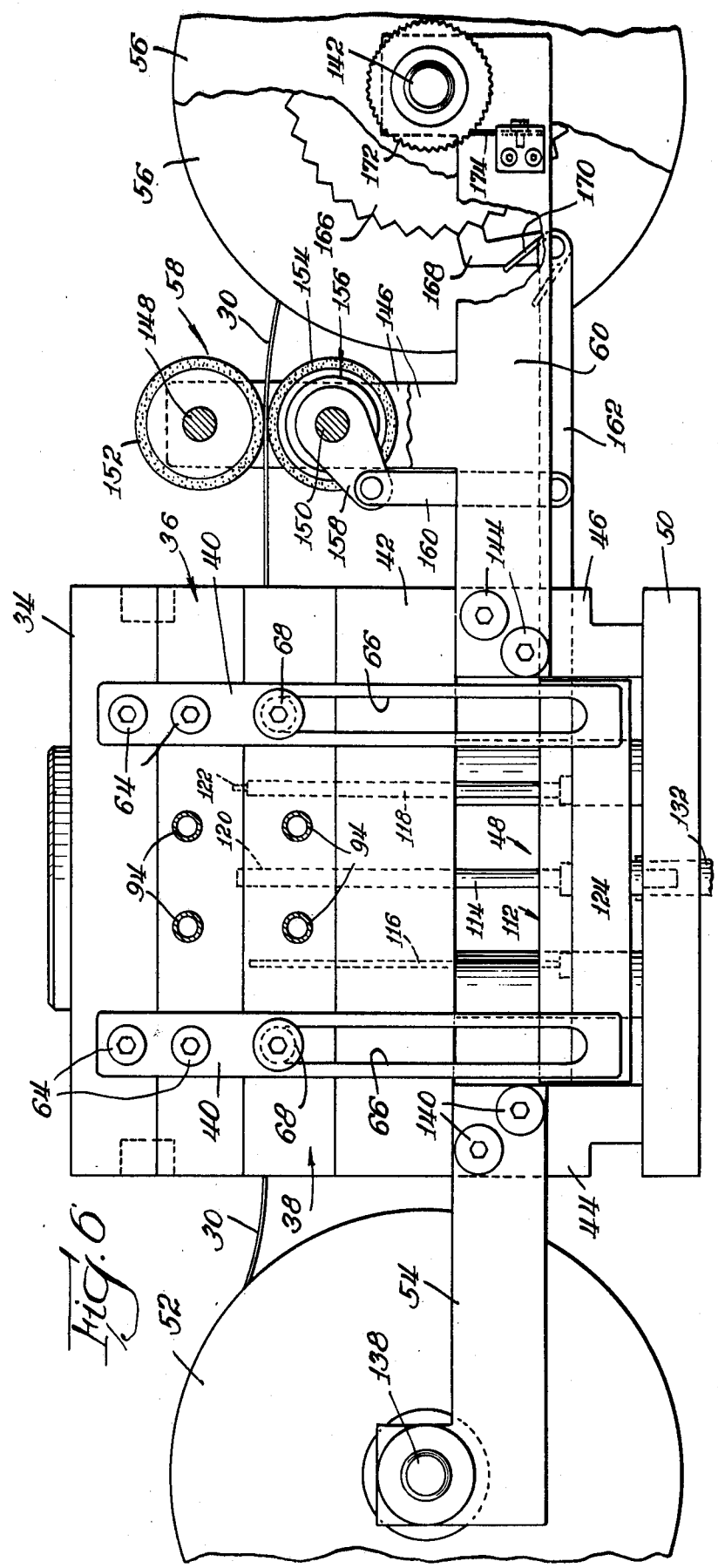

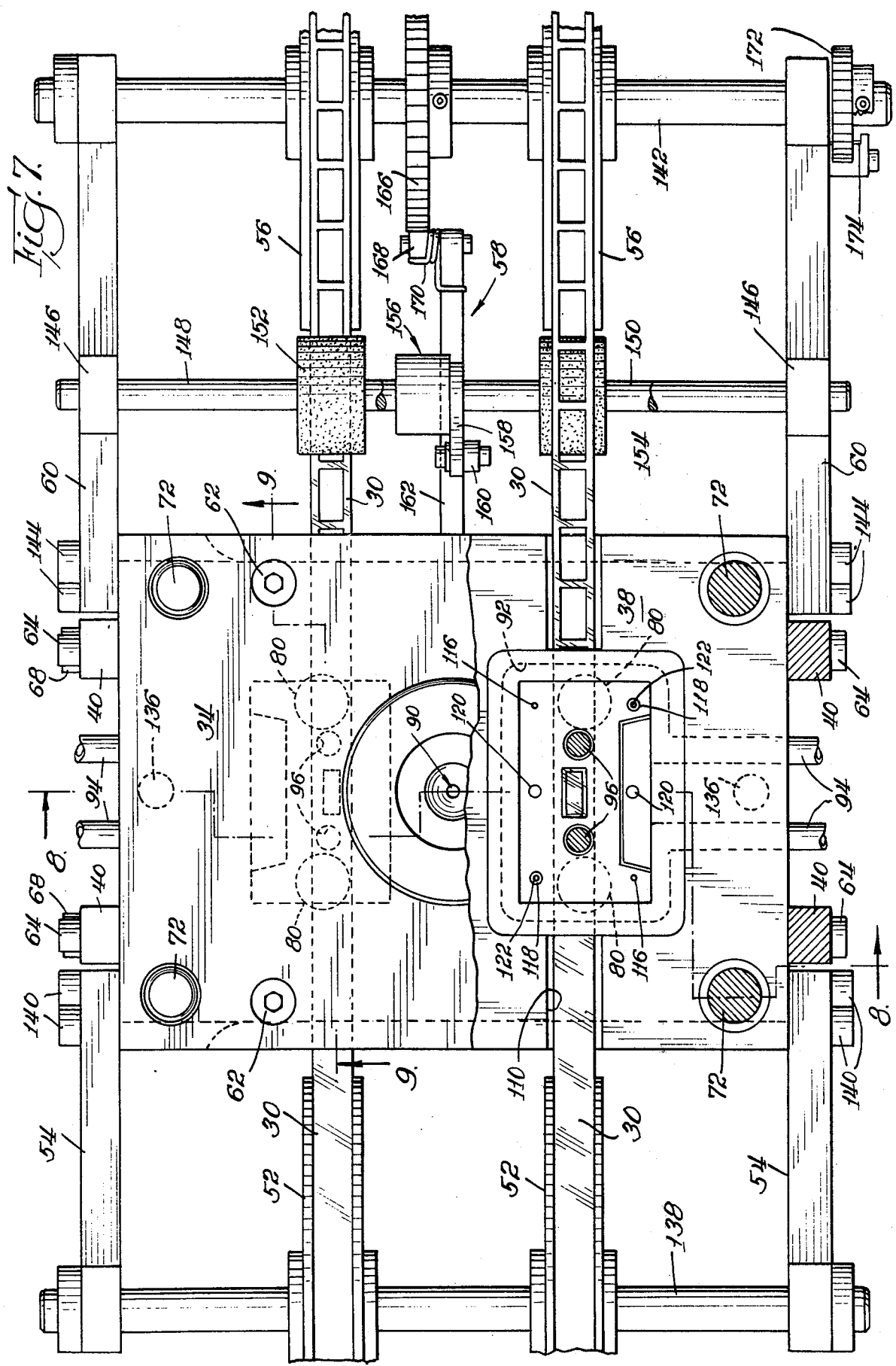

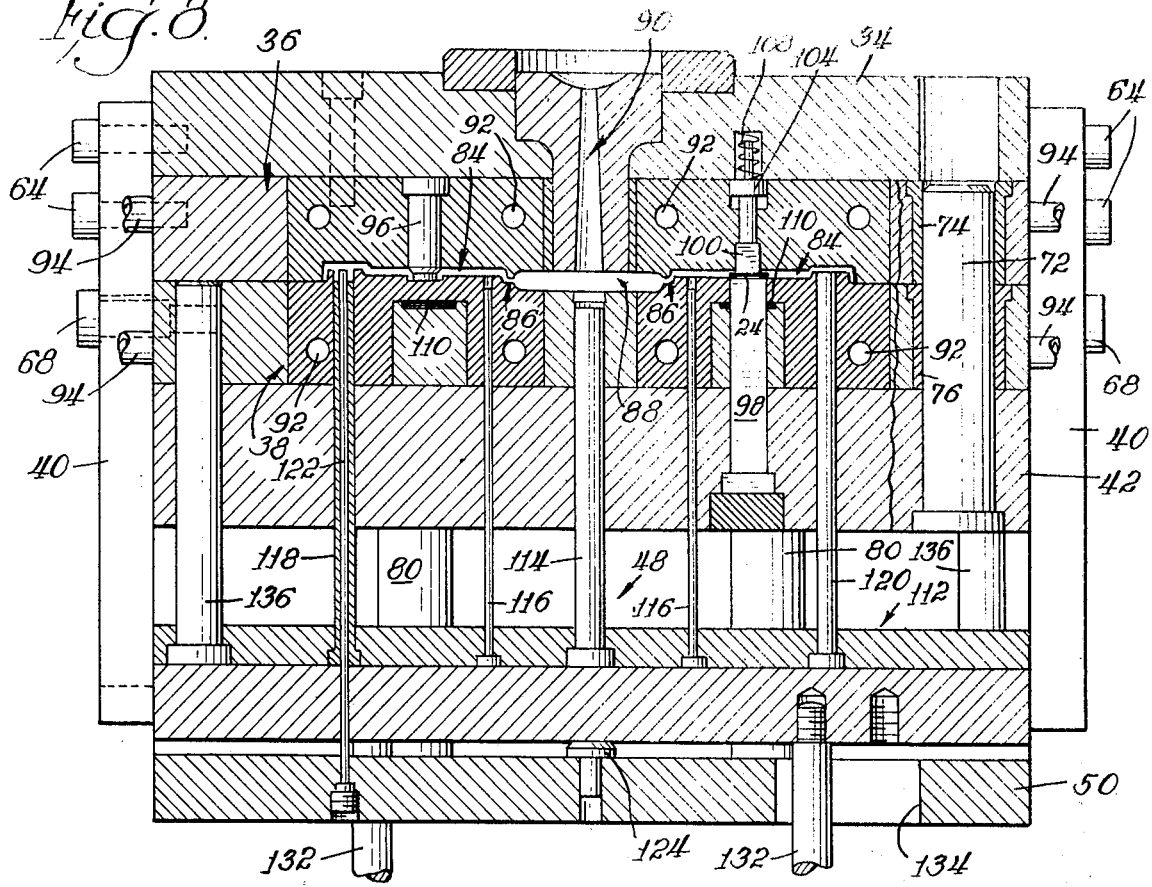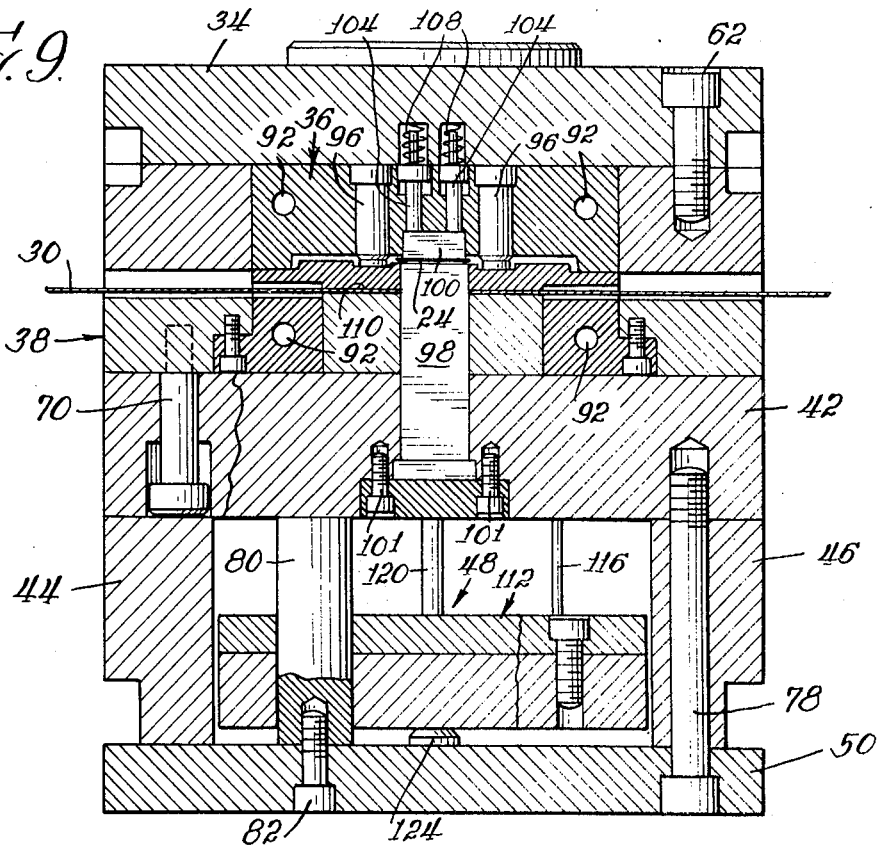

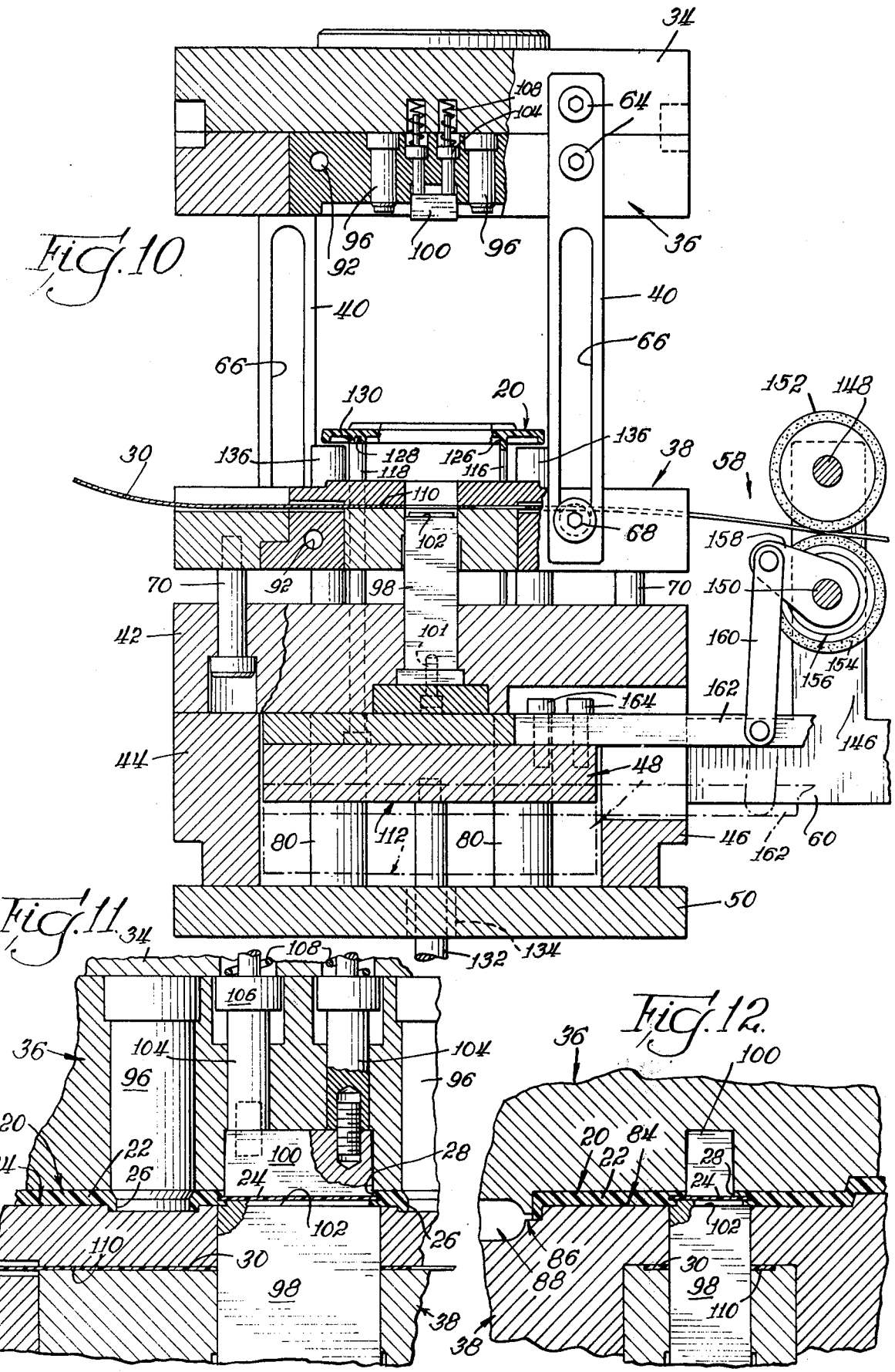

METHOD OF MOLDING A CASSETTE HALF WITH WINDOW INSERT

This is a division of Ser. No. 683,906, filed May 6, 1976 and now U.S. Pat. No. 4,061,455.

BACKGROUND OF THE INVENTION

1. Field of the Invention

The present invention relates generally to a method and/or apparatus for molding a plastic material in a frame about an insert, and more particularly to cassette or cartridge casings for holding spools of magnetic audio tape or the like.

2. Description of the Prior Art

Conventionally, cassette casings for holding spools of magnetic tape and the like comprise two identical sections which are joined together. Each section includes a viewing window through which may be observed the amount of unused and used tape on the primary and takeup spools mounted within the casing.

Heretofore, each casing section has been fabricated in three separate operations. First, a main body part with a central gap is formed of a thermoplastic material in an injection mold. Then, a window is cut to size from a transparent sheet or the like. Finally, the precut window is cemented in the gap of the main body part. These operations are time-consuming and relatively expensive. Moreover, if the cement about the window is discontinuous or deteriorates, the window can become loose or snap out exposing the tape interiorly of an assembled cassette to possible damage.

SUMMARY OF THE INVENTION

Each cassette casing section of the present invention comprises a main body part of solidified plastic material having an intermediate gap, and a transparent wafer serving as a viewing window extending across the gap. The transparent window wafer is mechanically embedded along at least a portion of its margins in the main body part. By integrally securing the wafer in the body part, looseness and separation of the wafer are eliminated.

The method of the present invention of forming the cassette casing section comprises the steps of supporting a transparent window wafer with no more than the margins thereof exposed within a cavity having a configuration of a casing section, and forcing a plasticized material into the cavity where it solidifies with at least a portion of the margins of the wafer embedded therein. Since the window wafer is secured in the main body part simultaneously with the formation of the latter, a separate cementing operation is eliminated.

The apparatus of the present invention for forming the cassette casing section comprises a pair of relatively movable cavity plate assemblies arranged when positioned together to define a casing section cavity, and support means associated with the cavity plate assemblies for supporting a transparent window wafer with no more than the margins thereof exposed within the cavity whereby plasticized material forced into the cavity solidifies with at least a portion of the margins of the wafer embedded therein. In addition, an elongated strip of transparent material is aligned with the cavity, and a portion of the support means is arranged to shear a window wafer from the strip for support in the cavity. Thus, the wafer is formed in conjunction with the molding of the casing section, and a remote operation of preforming a wafer is eliminated.

BRIEF DESCRIPTION OF THE DRAWINGS

FIG. 1 is a plan view of a cassette casing section embodying the principles of the present invention;

FIG. 2 is a sectional view taken substantially along the line 2—2 in FIG. 1 looking in the direction indicated by the arrows;

FIG. 3 is a sectional view taken substantially along the line 3—3 in FIG. 2 looking in the direction indicated by the arrows;

FIG. 4 is a plan view of a section of an elongated strip of transparent material from which cassette window wafers are severed;

FIG. 5 is similar to FIG. 4 but illustrates a section of an elongated strip of transparent material that is knurled along its margins;

FIG. 6 is a side elevational view of the apparatus of the present invention;

FIG. 7 is a plan view of the apparatus of FIG. 6 with portions thereof being broken away;

FIG. 8 is a sectional view taken substantially along the line 8—8 in FIG. 7 looking in the direction indicated by the arrows;

FIG. 9 is a sectional view taken substantially along the line 9—9 in FIG. 7 looking in the direction indicated by the arrows;

FIG. 10 is a partial view corresponding generally to FIG. 6 with portions of the apparatus being broken away and shown in section, and with the components disposed in a changed operating position;

FIG. 11 is an enlarged view of a portion of FIG. 9; and

FIG. 12 is an enlarged view of a portion of FIG. 8.

DESCRIPTION OF THE PREFERRED EMBODIMENT

Referring now to FIGS. 1-3, there is indicated generally by the reference numeral 20 a half-section of a cassette casing fabricated in accordance with the principles of the present invention. In a conventional manner, two identical casing sections 20 are adapted to be joined together, with primary and takeup spools (not shown) of magnetic audio tape or the like mounted therewithin, to form a standard assembled cassette.

The casing section 20 comprises a main body part 22 which is usually opaque or translucent, and a wafer 24 which is transparent. The body part 22 is fabricated of a solidified thermoplastic material such as polystyrene, and is formed with two spaced-apart generally circular apertures 26 and an intermediate or central generally rectangular gap 28. The apertures 26 serve to receive the spindles (not shown) of a cassette recorder or playback machine for winding tape from one spool to the other within an assembled cassette.

The wafer 24 extends across the gap 28, and is embedded along its margins in the body part 22. The wafer 24 serves as a viewing window through which may be observed the amount of tape wound on each of the spools within an assembled cassette. As will be described more fully hereinafter, the wafer 24 is sheared from an elongated strip 30 (FIG. 4) of transparent material such as Mylar. The surface of the strip 30 may be smooth as shown in FIG. 4, or may be knurled along its longitudinal margins 32 as shown in FIG. 5 to accommodate better gripping thereof.

Referring now to FIG. 6, there is shown the apparatus of the present invention for forming half-sections 20 of a cassette casing in accordance with the method of the present invention. In general, the apparatus comprises an upper platen 34, an upper cavity plate assembly 36, a lower cavity plate assembly 38, puller strap members 40, a backup plate member 42, a pair of spacer bars 44 and 46, an ejector unit 48 and a lower platen 50. The apparatus further comprises, as shown in FIGS. 6 and 7, a pair of supply reels 52 of strip material 30, support straps 54 for the supply reels 52, a pair of takeup reels 56 for the strip material 30, strip material advancing means 58, and support straps 60 for the takeup reels 56 and the advancing means 58.

The upper and lower platens 34 and 50 are respectively mounted to the movable head and the stationary base of a conventional injection molding press (not shown). The upper cavity plate assembly 36 is suitably secured, as by bolts 62 (FIGS. 7 and 9), to the upper platen 34, and is vertically movable with the upper platen 34 between the positions shown in FIGS. 6 and 10 toward and away from the lower cavity plate assembly 38.

The puller strap members 40 are suitably secured, as by bolts 64, to the sides of the upper platen 34 and the upper cavity plate assembly 36, and are formed with elongated slots 66 which slidably receive bolts 68 secured in the sides of the lower cavity plate assembly 38. When the upper platen 34 is raised and approaches the position shown in FIG. 10, the lower edges of the slots 66 engage the bolts 68 and raise the lower cavity plate assembly 38 away from the backup plate member 42. Thus, the puller strap members 40 serve as means for separating the lower cavity plate assembly 38 from the backup plate member 42 when the upper and lower cavity plate assemblies 36 and 38 are separated.

Movement of the lower cavity plate assembly 38 relative to the backup plate member 42 is limited by bolts 70 (FIGS. 9 and 10) secured in the underside of the lower cavity plate assembly 38 and slidable in the backup plate member 42. Registration of the upper and lower cavity plate assemblies 36 and 38 when positioned together is established by vertical corner guide posts 72 (FIGS. 7 and 8) secured in the backup plate assembly 42 and slidable in guide bushings 74 and 46 secured in the plate assemblies 36 and 38 respectively.

The backup plate member 42 seats on the spacer bars 44 and 46 which in turn seat on the lower platen 50. These components are suitably secured together as by bolts 78 (FIG. 9); and the backup plate member 42 is reinforced by vertical support posts 80 (FIGS. 9 and 10) secured to the lower platen 50 by bolts 82.

The upper and lower cavity plate assemblies 36 and 38, as shown in FIGS. 7 and 8, serve as a two-cavity injection mold, and when positioned together define a pair of cavities 84 each having the configuration of a half-section of a cassette casing. The cavities 84 communicate through gates 86 with a runner 88 which in turn communicates with a sprue 90 that extends upwardly through the upper cavity plate assembly 36 and the upper platen 34. The upper and lower cavity plate assemblies 36 and 38 are also formed with coolant passageways 92. Operationally, the sprue 90 is adapted to be connected with a plasticized material, while the coolant passageways 92 are adapted to be connected through tubing 94 with a source of circulating coolant.

Associated with each cavity 84 are a pair of vertical plug members 96 (FIGS. 7, 8, and 11) which are secured in the upper cavity plate assembly 36. The lower ends of the plug members 96 engage the lower cavity plate assembly 38 when the upper and lower cavity plate assemblies 36 and 38 are positioned together and thereby establish the apertures 26 in molded cassette casing sections 20.

Also associated with each cavity 84, as shown in FIGS. 8–12, are a lower vertical punch 98 and an upper aligned cooperating plunger 100. The punches 98 are suitably secured, as by bolts 101, in the backup plate member 42 and are slidable through the lower cavity plate assembly 38. Each punch 98 is generally rectangular in cross-section, and is formed with an undercut 102 at its upper end about the margins thereof (FIGS. 11 and 12). The plungers 100 are slidably received in the upper cavity plate assembly 36 and project downwardly and outwardly thereof. Each plunger 100 is generally rectangular in cross-section, and has a cross-sectional area somewhat smaller than that of the associated punch 98 (FIGS. 11 and 12). The plungers 100 are secured to the lower ends of vertical stems 104 (FIG. 11) which have motion-limiting collars 106 and which are biased downwardly by springs 108.

In relation to the punches 98, the lower cavity plate assembly 38 is formed with a pair of horizontal channels 110. Each channel 110 is aligned with a supply reel 52, a cavity 84, a punch 98 and a takeup reel 56, and serves to receive a material strip 30 therethrough. When the lower cavity plate assembly 38 is separated from the backup plate member 42, the upper ends of the punches 98 lie below the plane of the channels 110 and strip material 30 therein (FIG. 10).

When the lower cavity plate assembly is moved toward the backup plate member 42, each punch 98 shears a generally rectangular window wafer 24 from the adjacent material strip 30, and the sheared wafers 24 are engaged with the plungers 100 and disposed in the cavities 84. With the cavity plate assemblies 36 and 38 positioned together as shown for example in FIGS. 8 and 9, the punches 98 and plungers 100 serve to support, and securely hold in place, the wafers 24 with no more than the margins thereof exposed within the cavities 84.

As shown in FIG. 8, the ejector unit 48 comprises an ejector plate assembly 112 in which are anchored the lower end of a central vertical ejector member or bar 114 aligned with the sprue 90, and the lower ends of two sets of additional vertical ejector members aligned with the cavities 84. Each set of additional ejector members (FIGS. 7 and 8) comprises a pair of diagonally spaced-apart ejector pins 116, a pair of diagonally spaced-apart ejector sleeves 118, and a pair of intermediate transversely spaced-apart ejector rods 120. The ejector members are slidably guided in the backup plate member 42 and the lower cavity plate assembly 38. Also, vertical core pins 122 are secured in the lower platen 50 and slidably extend through the ejector plate assembly 112 and the ejector sleeves 118.

During the molding cycle, the lower cavity plate assembly 38 engages the backup plate member 42, and the ejector unit 48 assumes the position shown in FIG. 8 with the ejector plate assembly 112 resting on a positioning button 124 secured in the lower platen 50. When the assemblies 38 and 112 are thus positioned, the upper ends of the ejector pins 116 terminate slightly below the adjacent horizontal walls of the cavities 84 whereby to cause projections 126 (FIG. 10) to be formed on molded cassette casing sections 20, while the upper ends of the core pins 122 project slightly into the cavities 84 whereby to cause recesses 128 (FIG. 10) to be formed in the bosses 130 of molded cassette casing sections 20. When two casing sections 20 are being secured together, the projections 126 of each section fit into the recesses 128 of the other section for registration purposes.

When the upper cavity plate assembly 36 is separated from the lower cavity plate assembly 38, the ejector unit 48 is adapted to be raised, from the position shown in FIG. 8 to the position shown in FIG. 10, to eject formed cassette casing sections 20. Elevation of the ejector unit 48 is effected by hydraulically-powered vertical actuator rods 132 which project through slots 134 in the lower platen 50 and are secured in the ejector plate assembly 112. In addition, vertical return bars 136 (FIGS. 7, 8, and 10) are secured in the ejector plate assembly 112 and slidably guided in the backup plate member 42 and the lower cavity plate assembly 38. During downward movement of the upper cavity plate assembly 36 from the position shown in FIG. 10 to the position shown in FIG. 8, the assembly 36 engages the upper ends of the bars 136 and forces the latter downwardly for positive return of the ejector unit 48 from position shown in FIG. 10 to the position shown in FIG. 8.

As shown in FIGS. 6 and 7, the supply reels 52 are secured on a shaft 138 which is journaled at its ends in the outer ends of the support straps 54. The inner ends of the straps 54 are suitably secured, as by bolts 140, to the ends of the spacer bar 44. Correspondingly, the takeup reels 56 are secured on a shaft 142 which is journaled at its ends in the outer ends of the support straps 60. The inner ends of the straps 60 are suitably secured, as by bolts 144, to the ends of the spacer bar 46.

Referring now to FIGS. 6, 7, and 10, there will be described the strip material advancing means 58. Each takeup support strap 60 has an intermediate upright arm portion 146. Journaled at their ends in the arm portions 146 are a pair of vertically-spaced shafts 148 and 150. Secured on the upper shaft 148 are a pair of idler rollers 152 aligned with the material strips 30 and frictionally engaged with the upper surfaces thereof. Secured on the lower shaft 150 are a pair of drive rollers 154 aligned with the material strips 30 and frictionally engaged with the lower surfaces thereof. Also secured on the lower shaft 150, intermediate of the drive rollers 154, is a one-way clutch 156 having a crank arm 158. A link 160 at its upper end is pivotally connected to the crank arm 158 and at its lower end is pivotally connected to the intermediate portion of a generally horizontal lever 162 suitably secured, as by bolts 164, at its inner end to the ejector plate assembly 112.

When the ejector unit 48 is raised, the crank arm 158 is rotated from the position shown in FIG. 6 to the position shown in FIG. 10, and the one-way clutch 156 serves to rotate the shaft 150 and drive rollers 154 clockwise for advancing the material strips 30 to the right toward the takeup reels 56. As will be appreciated, the one-way clutch 156 permits the ejector unit 48 to be returned from the position shown in FIG. 10 to the position shown in FIG. 6 unaccompanied by any counter-rotation of the drive rollers 154.

The sections of the material strips 30, from which window wafers 24 have been sheared, are coiled around the takeup reels 56. In this connection, a ratchet wheel 166 is secured on the takeup shaft 142 intermediate of the takeup reels 56, and a pawl 168 is pivotally mounted on the outer end of the lever 162 with the free end thereof biased by a spring 170 into engagement with the ratchet wheel 166. The pawl 168 serves to rotate clockwise the ratchet wheel 166, the shaft 142 and the takeup reels 56, when the ejector unit 48 is raised and as the drive rollers 154 are rotated. To prevent counter-clockwise rotation of the shaft 142 and reels 56, a ratchet pinion 172 is secured on one end of the shaft 142 and engaged by the free end of a leaf spring follower 174 mounted on the adjacent support bracket 60.

There will now be described one cycle of operation of the described apparatus which is especially adapted for use in practicing the method of the present invention. At one point, the two-cavity injection mold, comprised of the cavity plate assemblies 36 and 38, is held closed (FIGS. 8 and 9) between the platens 34 and 50 in an injection molding press, while a transparent window wafer 24 is supported in each of the cavities 84 between the punches 98 and plungers 100. Then, a plasticized thermoplastic material is forced through the sprue 90, runner 88 and gates 86 into the cavities 84. In relation to each cavity 84, as shown in FIGS. 11 and 12, the plasticized material fills the cavity, flows about the margins of the wafer 24, and solidifies to form, in accordance with the present invention, a unitary cassette casing section 20 having a main body part 22 with the margins of the wafer 24 mechanically embedded therein.

Next, the upper cavity plate assembly 36 is raised by the upper platen 34 from the position shown in FIGS. 8 and 9 toward the position shown in FIG. 10. As the mold is initially opened, the spring biased plungers 100 bearing on the window wafers 24 hold the formed cassette casing sections 20 against the lower cavity plate assembly 38 while the upper cavity plate assembly 36 is disengaged therefrom. As the upper cavity plate assembly 36 approaches the position shown in FIG. 10, the puller strap members 40 raise the lower cavity plate assembly 38 away from the backup plate member 42 to the position shown in FIG. 10, thereby raising the elongated strips 30 of transparent material above the upper ends of the punches 98.

At this time, the ejector unit 48 is actuated and raised from the position shown in FIGS. 8 and 9 to the position shown in FIG. 10, thereby disengaging the formed cassette casing sections 20, and the intermediate waste material that solidified in the gates 86, runner 88 and sprue 90, from the lower cavity plate assembly 38. After the sections 20 are removed from the tops of the ejector members, the sections 20 are snapped away from the intermediate waste material and are available to be joined together, with spools of magnetic tape mounted therebetween, to form a standard assembled cassette. Also, as the ejector unit 48 is raised, the drive rollers 154 and the takeup reels 56 are rotated for respectively advancing and collecting the strip material 30. The strips 30 are advanced to move unused portions thereof over the punches 98.

Upon removal of the formed cassette casing sections 20, the upper platen 34 is moved downwardly from the position shown in FIG. 10 toward the position shown in FIGS. 8 and 9. The upper cavity plate assembly 36 initially contacts and pushes the ejector return bars 136 downwardly, and then engages the lower cavity plate assembly 38. Next, as the upper and lower cavity plate assemblies 36 and 38 are moved toward the backup plate member 42, window wafers 24 are sheared by the punches 98 from the material strips 30, and the sheared wafers 24 are engaged with the plungers 100. Each wafer 24, as it is punched from the strip, is thereafter held securely between the respective punch 98 and the spring biased plunger 100, while the assembly 38 moves toward assembly 42. When the wafer 24 is positioned in cavity 84, it is gripped securely between the punch 98 and the plunger 100 to prevent its displacement during the mold cycle and the punch and plunger define the molded margin of the wafer. When the components of the apparatus have been returned to the position shown in FIGS. 8 and 9, the window wafers 24 are supported by the punches 98 and plungers 100 within the cavities 84, and the apparatus is in condition for another cycle of operation. The various steps of the method of the present invention are carried out during each cycle of operation of the apparatus.

While the invention has been described with respect to a cassette utilizing an insert or wafer 24 sheared from a strip 30, the invention is believed capable of use in providing a window for apparatus other than cassettes as for example calculator housing portions or other apparatus. It will also be appreciated that the supply reels 52 and 56 may under certain circumstances be omitted and instead the strip may be formed by simply extruding a plastic material in the cavity plate assembly 38, for example. Alternatively the strip 30 may be sheet metal strip and the wafers formed therein are inserted in a molded plastic material at cavity 84 with the molded plastic material forming a frame such as the cassette about the insert. Thus it is believed the invention constitutes a method and/or apparatus for forming a frame about an insert whether the frame constitutes a housing or other portion and irrespective of the material from which the insert or wafer is formed.

While there has been shown and described a preferred embodiment of the present invention, it will be understood by those skilled in the art that various rearrangements and modifications may be made therein without departing from the spirit and scope of the invention.

The invention claimed is:

1. The method of molding a member defining a frame, said frame surrounding and retaining an insert member, which comprises: placing a pair of relatively movable mold cavity plate assemblies into an arrangement to define at least one mold cavity having the configuration of said frame-defining member, passing a strip of insert-forming material through a channel defined in one of said mold cavity plate assemblies, and moving a punch transversely through said channel in said mold cavity plate assembly to shear an insert member from said elongated strip of insert-forming material, while causing the margin of said insert member to protrude laterally beyond the end of said punch, moving said insert member into the cavity, thereafter filling said cavity with plasticized material to cause at least a portion of the margin of said insert member to become embedded in said plasticized material, and allowing said plasticized material to harden, whereby said insert member becomes embedded in the molded frame.

2. The method of claim 1 which includes bringing said insert member into engagement with a plunger carried by the other of said cavity plate assemblies and movably positioned on an axis transverse to the channel, whereby the margin of said insert member protrudes laterally beyond the end of said plunger, to firmly position said insert member in the mold cavity.

3. The method of claim 2 in which, after said hardening, the mold halves are opened and said frame and insert member are ejected by being pressed out of the mold by slidable ejector pins.

4. The method of claim 2, in which said molding process is repeated, and said elongated strip of insert-forming material is advanced, between each molding process, to expose said punch with a fresh portion of said elongated strip.

5. The method of claim 2, which includes repeatedly molding said frame and insert members, and, between each molding cycle, indexing said elongated strip of insert-forming material through said channel to permit said punch to shear a successive plurality of insert members from said elongated strip as the elongated strip is successively indexed through said channel, to permit the mold to produce a succession of frame-defining members carrying an insert member.

6. The method of claim 2 in which said insert member is engaged by said punch and said plunger while moving toward said mold cavity.

7. The method of claim 6 in which a cassette casing having a window is manufactured.

* * * * *